(12) United States Patent
Shelor (10) Patent No.: US 7,013,383 B2
(45) Date of Patent: Mar. 14, 2006

(54) APPARATUS AND METHOD FOR MANAGING A PROCESSOR PIPELINE IN RESPONSE TO EXCEPTIONS

(75) Inventor: Charles F. Shelor, Arlington, TX (US)

(73) Assignee: VIA-Cyrix, Inc., Fremont, CA (US)

( * ) Notice: Subject to any disclaimer, the term of this patent is extended or adjusted under 35 U.S.C. 154(b) by 463 days.

(21) Appl. No.: 10/602,931

(22) Filed: Jun. 24, 2003

(65) Prior Publication Data

US 2004/0268103 A1    Dec. 30, 2004

(51) Int. Cl.
*G06F 9/38* (2006.01)
(52) U.S. Cl. ...................................... 712/244
(58) Field of Classification Search ............... 712/244; 710/260
See application file for complete search history.

(56) References Cited

U.S. PATENT DOCUMENTS

| | | | |
|---|---|---|---|
| 5,193,156 A | | 3/1993 | Yoshida et al. |
| 5,226,130 A | * | 7/1993 | Favor et al. ................ 712/238 |
| 5,442,756 A | | 8/1995 | Grochowski et al. |
| 5,542,109 A | | 7/1996 | Blomgren et al. |
| 5,606,675 A | | 2/1997 | Sakamura et al. |
| 5,606,676 A | | 2/1997 | Grochowski et al. |
| 5,615,350 A | | 3/1997 | Hesson et al. |
| 5,625,789 A | | 4/1997 | Hesson et al. |
| 5,666,506 A | | 9/1997 | Hesson et al. |
| 5,740,417 A | | 4/1998 | Kennedy et al. |
| 5,805,879 A | | 9/1998 | Hervin et al. |
| 5,884,061 A | | 3/1999 | Hesson et al. |
| 5,949,996 A | | 9/1999 | Atsushi |
| 5,951,678 A | | 9/1999 | Moyer |
| 6,125,443 A | | 9/2000 | Takahashi |
| 6,192,466 B1 | | 2/2001 | Gshwind |

* cited by examiner

*Primary Examiner*—William M. Treat
(74) *Attorney, Agent, or Firm*—Thomas, Kayden, Horstemeyer & Risley (57) ABSTRACT

The present invention is generally directed to an apparatus and method for performing a partial flush of a processor pipeline in response to exceptions (e.g., interrupts). In accordance with an aspect of one embodiment a processor is provided with logic that operates to flush only limited stages of a processor pipeline (e.g., stages between the current instruction and the pending interrupt) if the execution of a current instruction will impact the execution of a pending interrupt (e.g., if the current instruction is a branch, if the current instruction would cause the processor to enter a mode that disables the pending interrupt, etc.). In accordance with another aspect of this embodiment, a method is provided for performing a partial flush of processor pipeline if the execution of a current instruction would impact the execution of a pending interrupt.

26 Claims, 8 Drawing Sheets

APPARATUS AND METHOD FOR MANAGING A PROCESSOR PIPELINE IN RESPONSE TO EXCEPTIONS

FIELD OF THE INVENTION

The present invention generally relates to processors, and more particularly to an apparatus and method for managing a processor pipeline in response to exceptions.

BACKGROUND

Processors (e.g., microprocessors) are well known and used in a wide variety of products and applications, from desktop computers to portable electronic devices, such as cellular phones and PDAs (personal digital assistants). As is known, some processors are extremely powerful (e.g., processors in high-end computer workstations), while other processors have a simpler design, for lower-end, less expensive applications and products.

As is known, many processors have pipelined architectures to increase instruction throughput. In theory, scalar pipelined processors can execute one instruction per machine cycle (and more in super-scalar architectures) when executing a well-ordered, sequential instruction stream. This is accomplished even though an instruction itself may implicate or require a number of separate micro-instructions to be effectuated. Pipelined processors operate by breaking up the execution of an instruction into several stages that each require one machine cycle to complete. For example, in a typical system, an instruction could require many machine cycles to complete (fetch, decode, ALU operations, etc.).

Figure 1:
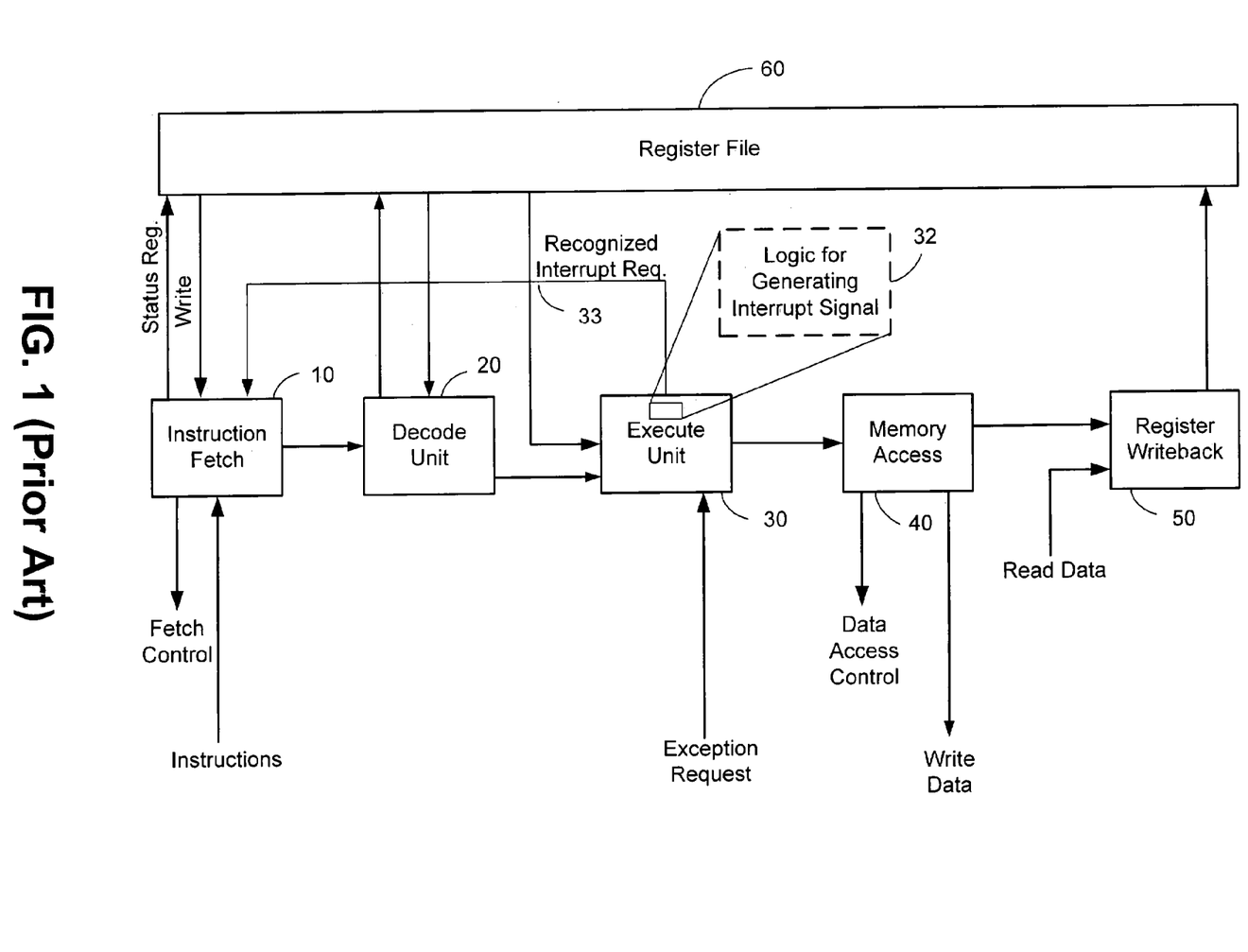
FIG. 1 is a block diagram illustrating certain stages or components of a pipelined processor, as is known in the prior art.

Reference is made to FIG. 1, which is a block diagram illustrating certain stages within a pipelined processor, as is known. In the architecture of FIG. 1, illustrated are an instruction fetch unit 10, a decode unit 20, an execute unit 30, a memory access unit 40, and a register writeback unit 50. The operation of these units (or logic blocks) is known by persons skilled in the art. In this regard, an instruction fetch unit 10 performs instruction memory fetches. This unit is configured to determine the value or contents of a program counter (within the register file 60) for in-order instruction execution, as well as exception vectors, branches, and returns. The instruction fetch unit 10 is also configured to determine the return address for all exceptions and branch-link instructions, and write or store that return address into an appropriate register within the register file 60. Consistent with the invention, addressing of instruction fetches may be through physical addresses directly to memory, or through an instruction cache (not shown) using physical or virtual addresses. Although the internal architecture of the register file 60 is not shown, the register file 60 includes various registers utilized by the processor. As is known, such registers may include general-purpose registers or special-purpose registers (such as status registers, a program counter, etc.).

The decode unit 20 operates to decode instructions passed to it from the instruction fetch unit 10 and generate the necessary control signals for the execute unit 30 to carry out the execution of the particular instruction. The specific architecture of decode units (like decode unit 20) are processor dependent, but the operation and organization of such will be understood by persons skilled in the art. Likewise, the structure and operation of the execute unit 30 are processor dependent, but is understood by persons skilled in the art. Generally, an execute unit includes circuitry to carry out the execution of instructions as determined by the control signals generated from the decode unit 20.

As illustrated in FIG. 1, the execute unit 30 of the illustrated embodiment includes logic 32 for generating one or more interrupt signals (or interrupt requests) 33. As the names imply, the interrupt signal 33 indicates an interrupt condition (e.g., IRQ, FIQ, etc.) is pending or requested. The memory access unit 40 interfaces with external data memory for reading and writing data in response to the instruction being executed by the execute unit 30. Of course, not all instructions require memory accesses, but for those that do, the memory access unit 40 carries out the requisite access to external memory. Consistent with the invention, such memory access may be direct, or may be made through a data cache using either physical or virtual addressing.

Finally, the register writeback unit 50 is responsible for storing or writing contents (resulting from instruction execution), where appropriate, into registers within the register file 60. For example, consider the execution of an instruction that adds the contents of two general-purpose registers and stores the contents of that addition into a third general-purpose register. After execution of such an instruction, the register writeback unit 50 causes the value obtained in the summation to be written into the third general-purpose register.

With regard to interrupt handling, processors like that of FIG. 1 generally operate as follows. An external interrupt request is made of the processor, and this exception request is communicated to the execute unit 30. In response, the execute unit 30 examines the interrupt status of the processor and when the particular interrupt is enabled, it generates a recognized interrupt request 33 that is communicated to the instruction fetch unit 10. The fetch unit 10 then "vectors" to an address corresponding to the requested interrupt (e.g., an address dedicated via hardware to store instructions to handle an interrupt) and retrieves a first instruction associated with the interrupt service routine. Generally, this first instruction is a branch to a location where a user-defined interrupt service routine is stored. Then, the interrupt-related instruction progresses through the pipeline like any other instruction.

In addition, when the execute unit 30 receives the interrupt request and generates the recognized interrupt request 33, it also generates a flush signal/command (not shown), which causes all preceding pipeline stages to flush their contents. This flush is generally performed as a routine, cautionary measure to ensure that no later intervening instruction is encountered that causes the execute unit to, for example, change modes (which may mask or otherwise adversely impact the execution of the interrupt). Thus, any pending instructions within the pipeline are flushed (e.g., replaced with NO-OPs), and the address of the first flushed instruction is set as a return address that is accessed upon completion of the interrupt service routine. This has the result of having the first instruction associated with the interrupt to be the first instruction executed after receipt of the exception request.

Several clock cycles are lost, however, in connection with the flush, until the first instruction associated with the interrupt service routine can pass through the pipeline and reach the execute unit 30. Accordingly, it is desired to provide an improved architecture for handling interrupts to improve the processor efficiency in connection with this flush operation.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve certain advantages and novel features, the present invention is generally directed to an apparatus and method for performing a partial flush of a processor pipeline in response to exceptions (such as interrupts). In accordance with an aspect of one embodiment a processor is provided with logic that operates to flush only limited stages of a processor pipeline (e.g., stages between the current instruction in the execute stage and the stage containing the first instruction of the pending interrupt) if the execution of a current instruction will impact the execution of a pending interrupt (e.g., if the current instruction is a branch, if the current instruction would cause the processor to enter a mode that disables the pending interrupt, etc.). In accordance with another aspect of this, embodiment, a method is provided for performing a partial flush of a processor pipeline if the execution of a current instruction would impact the execution of a pending interrupt.

The present invention allows a processor to execute instructions already fetched into the pipeline (so long as the instructions do not impact the execution of the interrupt handling), without having to flush those instructions and re-fetch them after processing the interrupt. Consequently, the processor's efficiency is enhanced.

DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

It is noted that the drawings presented herein have been provided to illustrate certain features and aspects of embodiments of the invention. It will be appreciated from the description provided herein that a variety of alternative embodiments and implementations may be realized, consistent with the scope and spirit of the present invention.

Before describing certain particular preferred embodiments, it is noted that there may be varied uses of the term "interrupt" herein. To better understand the nomenclature generally used herein, an interrupt request (or interrupt service request) refers to a signal that input to an execute unit within a pipelined processor, which signals an event for interrupt servicing or processing. In operation, the execute unit evaluates a current status, state, or mode of the processor do determine whether such an interrupt request may be serviced at the present time. If so (e.g., if the requested interrupt is not masked), then the execute unit generates a "recognized interrupt request," which is a signal that is communicated to a front-end pipeline stage (e.g., a fetch unit, instruction address generation unit, etc.), which "vectors" to the interrupt service routine. As is known, the interrupt service routine refers to the stored instructions for execution by the processor to process or respond to the interrupt event (the interrupt event being the external condition that precipitated the interrupt service request). Certain of these terms may sometimes be referred to herein generically as interrupt. However, persons skilled in the art will understand the proper connotation and meaning of any such generic reference, as may be used herein, based upon the context in which the reference is made.

Figure 2:
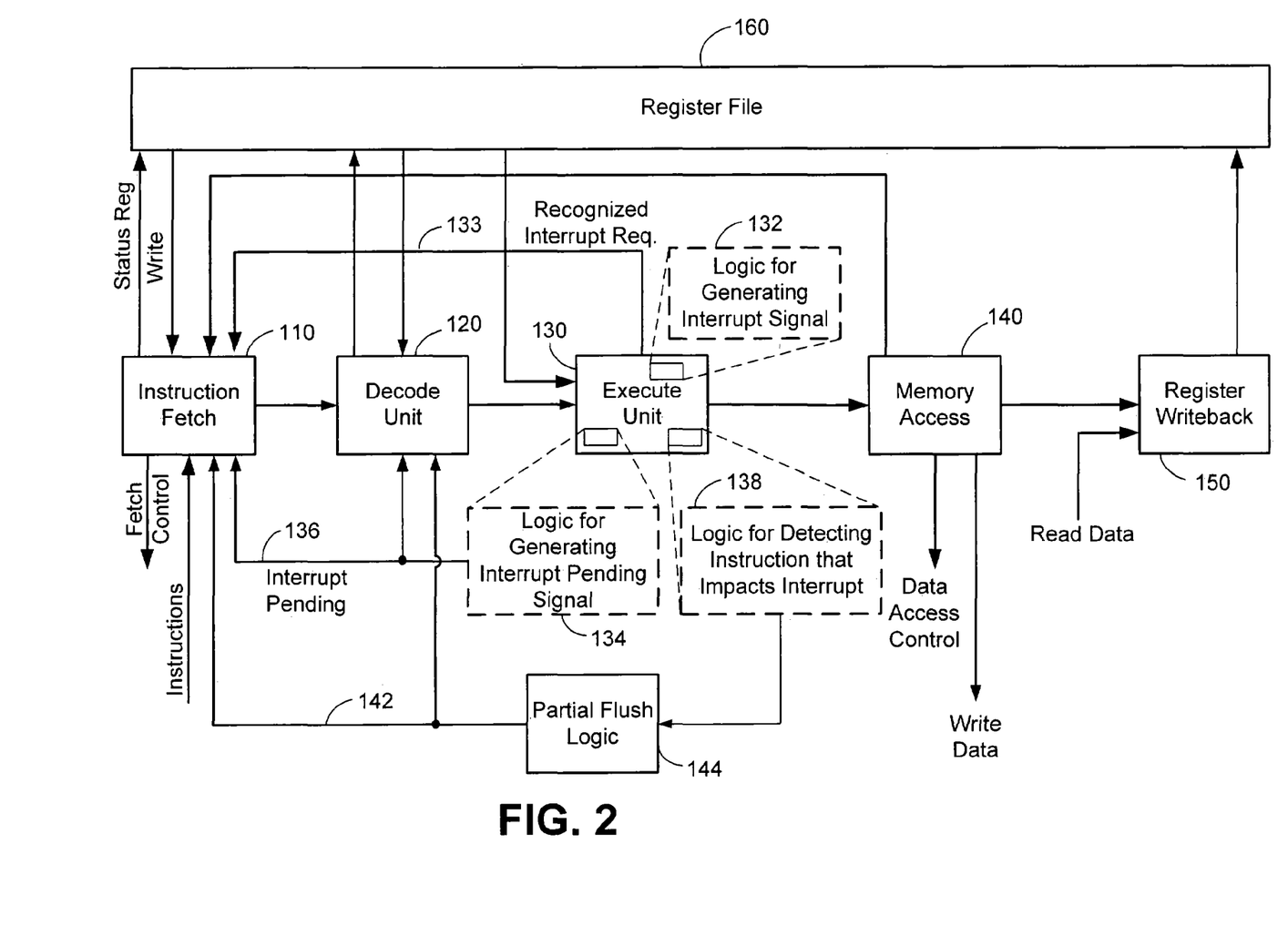
FIG. 2 is a block diagram similar to FIG. 1, further illustrating certain stages or components of a pipelined processor constructed in accordance with one embodiment of the present invention.

Reference is now made to FIG. 2, which illustrates certain components or stages within a pipelined processor. Like FIG. 1, FIG. 2 includes certain conventional components, such as an instruction fetch unit 110, a decode unit 120, an execute unit 130, a memory access stage 140, a register writeback 150, and a register file 160. Generally, these components or stages operate similar to those described in connection with FIG. 1, and in a manner that will be understood by persons skilled in the art, and therefore a belabored discussion of the structure and operation of these components is not provided herein. Instead, the discussion provided herein will focus on certain features or aspects of the illustrated embodiments that are relevant to the invention. As described in connection with FIG. 1, the execute unit 130 may include logic 132 for generating an interrupt signal, such as a recognized interrupt request 133 that is communicated to an instruction fetch unit 110.

In accordance with one embodiment of the invention, the execute unit 130 may also include logic 134 for generating an interrupt pending signal 136. In the illustrated embodiment, this signal 136 may be communicated to each of the pipelined stages 110 and 120 that precede the execute unit 130. In the illustrated embodiment, there are only two such stages. However, in other embodiments of pipelined processors, additional or fewer stages may be provided. The execute unit 130 may also include logic 138 for detecting a current instruction that impacts a pending interrupt. In this regard, instructions may impact the execution of an interrupt in a variety of ways. One example of an instruction that impacts a pending interrupt is an instruction that masks the interrupt, or an instruction that causes the processor to go into a mode that would not recognize or service the interrupt. Since the interrupt request would have been generated in response to an interrupt request (e.g., a hardware interrupt request), in theory this request should be serviced before executing any further instructions. However, consistent with the scope and spirit of the present invention, performance is enhanced by allowing the execution of instructions already in the pipeline, so long as those instructions will not impact the operation or servicing of the pending interrupt. Clearly, an instruction that masks an interrupt or causes the processor to enter a mode that would not recognize the interrupt request will adversely impact the execution of the interrupt service routine. Accordingly, such an instruction will cause the system to perform a partial flush of the pipeline, flushing that current instruction and all subsequent instructions between the current instruction and the first instruction of the pending interrupt.

Another example of an instruction that, in some embodiments, may impact the processing of the prefetched instructions prior to the execution of a pending interrupt is a mispredicted branch instruction (either conditional or unconditional branch instruction). A correctly predicted branch instruction is one where the immediately following instruction was prefetched from the correct branch destination address. A mispredicted branch instruction is one where the immediately following instruction was prefetched from the incorrect address. The instructions following the mispredicted branch should be flushed from the pipeline and the return address of the interrupt service routine should be set to the correct branch destination address.

As should be understood from the description provided herein, one embodiment of the present invention may determine whether a mispredicted branch instruction is encountered during the pendency of an interrupt (e.g., after an interrupt request has been recognized by an execute unit but before the first instruction of the interrupt service routine has reached the execute unit for processing). A simpler approach, however, may be implemented in accordance with another embodiment of the invention, whereby any branch instruction encountered during the pendency of an interrupt operates to perform a flush to the stages of the pipeline between the current instruction and the first instruction of the interrupt service routine.

Therefore, it should be understood that the broader aspects of the present invention are not limited to any particular instructions, but rather instructions that impact the execution of an interrupt may vary from processor to processor. What is relevant for purposes of this embodiment of the present invention is that upon encountering an instruction that is determined to impact the execution of a pending interrupt, a partial flush of the pipeline is performed, which flushes all intermediate stages between the current instruction and the first instruction associated with the pending interrupt. The circuitry or logic for carrying out such a flush need not be described herein, as flushes of pipeline stages are known and understood by persons skilled in the art. What is unique in the context of this embodiment of the invention is that only a limited number of stages of the pipeline are flushed.

It should be appreciated that, consistent with the invention, there are a variety of ways for determining whether a current instruction will impact a pending interrupt. One simple approach may be to simply compare a current instruction against a list of instructions in a look-up table, which are instructions pre-determined or deemed to impact the execution of an interrupt for a given processor. Other methods, employing greater levels of sophistication may also be employed.

In keeping with the description of FIG. 2, partial flush logic 144 is provided for carrying out the partial flush operation. As illustrated in the drawing, the partial flush logic generates an output 142 that may be communicated to each stage of the pipeline preceding the execute unit 130. Although not specifically illustrated in FIG. 2, each stage of the pipeline includes logic for flushing the instruction currently carried in that stage, if the instruction precedes the first instruction associated with the pending interrupt. Manners in which this functionality may be implemented or carried out will be described further herein. It should be appreciated, however, that the components 134, 138, and 144 of the embodiment illustrated in FIG. 2 may be implemented in a variety of ways, consistent with the scope and spirit of the invention.

Figure 3:
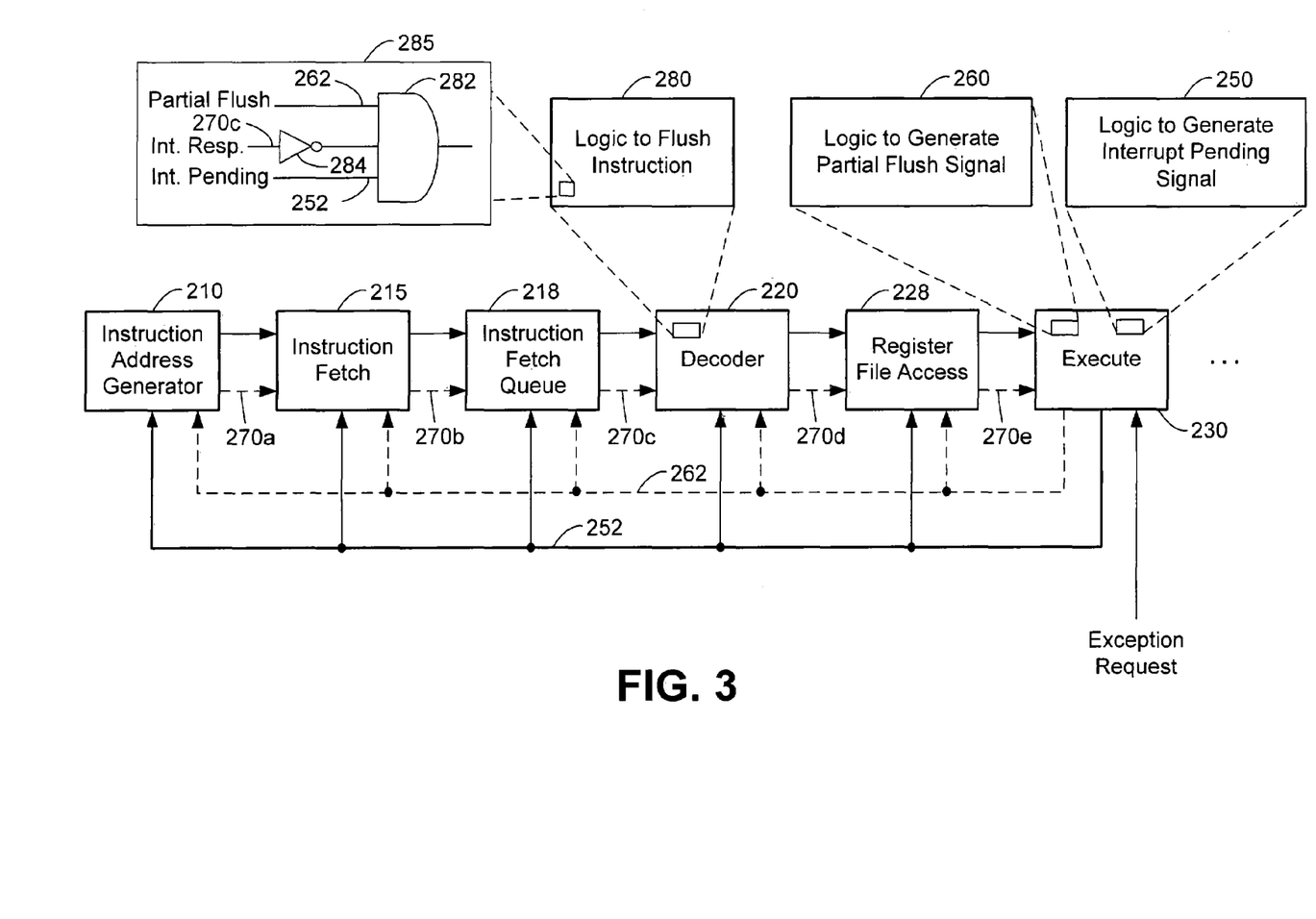
FIG. 3 is a block diagram illustrating certain components or stages of a pipelined processor constructed in accordance with one embodiment of the present invention.

Reference is now made to FIG. 3, which is a block diagram illustrating certain components or stages in a pipelined processor, in accordance with an alternative embodiment of the present invention. In the embodiment illustrated in FIG. 3, additional pipelined stages are illustrated preceding the execute unit 230. These components include an instruction address generator 210, an instruction fetch unit 215, an instruction fetch queue 218, a decoder 220, and a register file access component 228. The first three stages of the illustrated pipeline effectively comprise the fetch stage of FIG. 2. Briefly, the instruction address generator 210 determines the address from which to fetch an instruction. As is known, usually an instruction is fetched by using the value of a program counter as the instruction address and then incrementing the program counter to generate the next instruction address. In the illustrated embodiment of FIG. 3, the program counter is implemented in the instruction address generator 210. The program counter value of the current instruction may be passed through the pipeline, and units may provide the data in response to a reference to the program counter. As is known, branches and exceptions override the increment operation of the program counter, and generate a new value for the program counter. The instruction address generator 210 may be designed to speculatively pre-fetch instructions in order to increase system performance.

The instruction fetch stage 215 performs the instruction fetch. In a system implementing an instruction cache (not shown), the instruction fetch component 215 may provide a clock cycle for the instruction cache system to access the tag array during the first half of the clock and determine cache hit or miss during the second half of the clock. The instruction fetch stage 215 may pass the value of the program counter address and status to the instruction fetch queue 218. In one embodiment, the instruction fetch queue 218 may contain a four-entry instruction queue. This queue may de-couple the execution of instructions from the fetch of instructions. In this regard, it allows a deeper pre-fetch to be performed during instructions that require multiple clocks to execute and can therefore reduce downstream sensitivity to instruction cache misses. The instruction fetch queue 218 simply extracts the next instruction from its queue and passes it to the decoder 220.

The decoder stage 220 of the pipeline is used to decode the instruction extracted from the instruction fetch queue 218. As is known, the decoder 220 operates to take an encoded instruction and decode it into a number of data and control signals required to carryout the execution of the instruction in the particular processor. The register file access 228 stage uses the results of the instruction decode to access operands that are called for by the instruction. The register file access 228 may determine the source of each operand as either from the register file (see FIG. 2) or from the pipeline itself, using data forwarding (not shown). Finally, the execute stage 230 manipulates the operands provided by the register file access stage 228 or otherwise carries out the instruction specified.

A variety of downstream pipeline stages may also be implemented, but need not be described herein as they are not implicated by the present invention. As previously described, the present invention operates to perform a partial flush of the pipeline when an instruction is encountered by the execute stage 230 that would adversely impact the execution of a pending interrupt. To carry out this inventive functionality, the execute stage 230, in addition to conventional operations and logic, includes logic 250 to generate an interrupt pending signal 252 that may be communicated to all stages of the pipeline that precede the execute stage 230. The execute component 230 may also include logic 260 to generate a partial, flush signal 262 that may be communicated to each of the pipeline stages preceding the execute stage 230. The interrupt pending signal, as illustrated in FIG. 2 as 136, may be a signal that is separate and independent from the recognized interrupt request signal 133 that is conventionally generated by the execute unit and communicated to the fetch unit (see FIG. 2). In certain embodiments, however, the interrupt pending signal may be implemented as the same signal as the recognized interrupt request as shown in FIG. 3. Each of the pipeline stages preceding the execute stage 230 may include logic 280 to carryout the function of flushing the instruction currently contained in that stage when necessary. This logic may be implemented in conventional ways, as complete flushes of pipelines have been implemented in the past. One way of implementing a flush of a particular pipeline stage would be to simply replace the current instruction with a NO-OP instruction.

In the embodiment of FIG. 3, each pipeline stage receives both an interrupt pending signal 252 and a flush signal 262. In addition, each pipeline stage may include logic (not shown) for generating a signal 270a–270e that is passed to the next stage along with the first instruction associated with the interrupt. Assuming this signal is active high, as the instruction address generator 210 generates the vector address for the interrupt and passes the interrupt to the instruction fetch stage 215, then signal line 270a is asserted. In such an embodiment, the logic to flush the instruction 280 may include comparison logic 285 for triggering the flush. This comparison logic 285 may be implemented (logically) as illustrated in FIG. 3, with a three input AND gate 282 and an inverter 284. In this regard, the comparison logic 285 may include the logical ANDing of the partial flush signal 262, the interrupt pending signal 252, and the inverse of the interrupt response signal 270c (for the decoder stage 220). In this regard, no flush of a given stage will occur unless both the flush signal 262 and interrupt signal 252 are a logic one (asserted) and the intermediate interrupt response signal 270C is a logic zero (unasserted), indicating that the first instruction associated with the interrupt has not yet reached that stage of the pipeline. In one embodiment, each stage of the pipeline includes the logic 280 to flush the instruction currently carried in that stage of the pipeline. Thus, when the logic 250 and 260 within the execute unit 230 asserts both the interrupt pending signal 252 and partial flush signal 262, then every stage of the pipeline preceding the execute stage 230 that the interrupt response instruction [270a–e] has not reached will be flushed.

Of course, and as will be appreciated by persons skilled in the art, consistent with the scope and spirit of the present invention, a variety of alternative logic structures and implementations may be implemented for logic components 250, 260, and 280 for implementing the inventive aspects of the illustrated embodiment.

Figure 4:
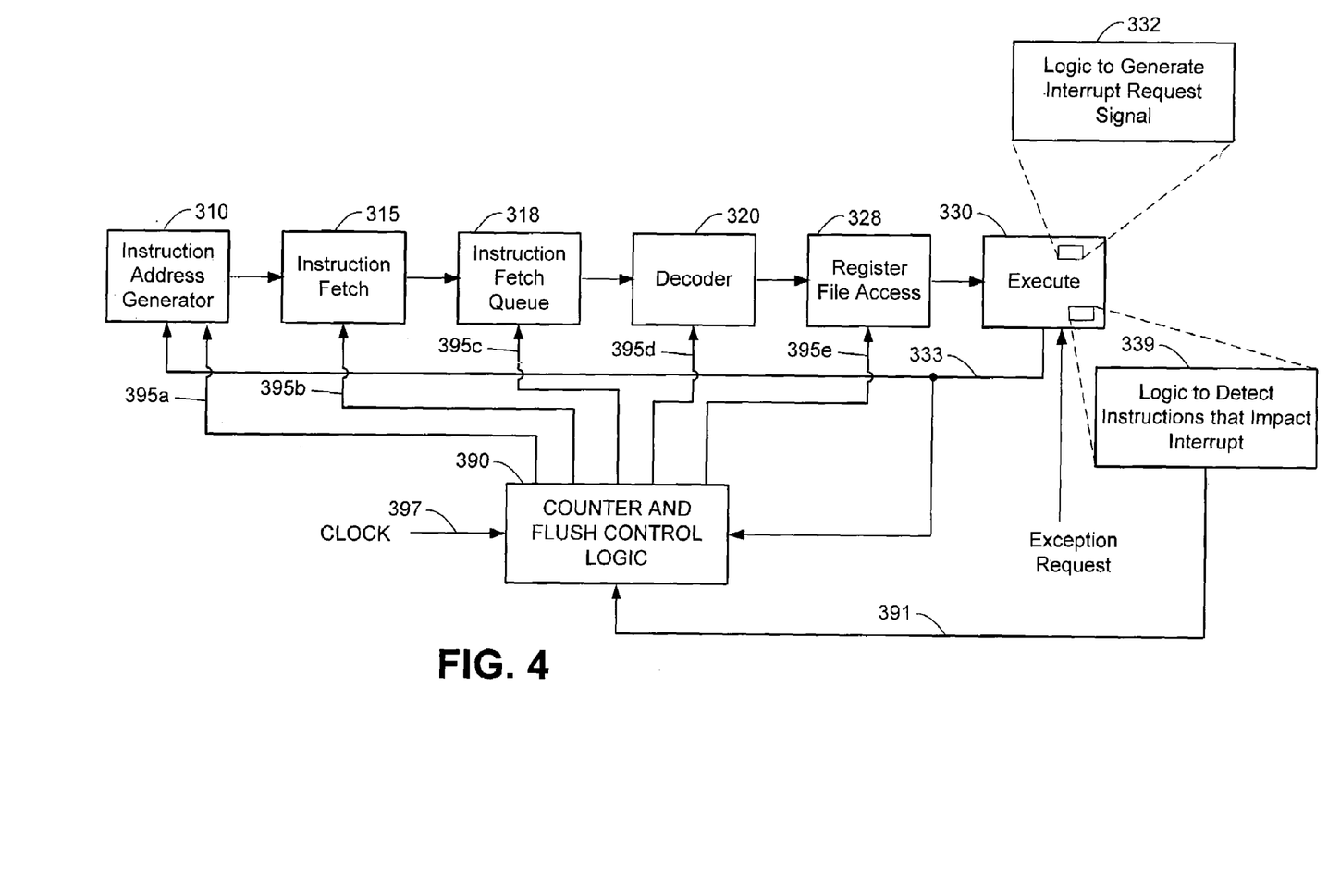
FIG. 4 is a block diagram illustrating certain stages or components of a pipelined processor constructed in accordance with an alternative embodiment of the present invention.

Reference is now made to FIG. 4, which is a block diagram illustrating the same pipeline stages that were illustrated in FIG. 3, but illustrating an alternative embodiment of the present invention. In this embodiment, the execute unit 330 may include logic 332 for generating an interrupt request signal 333. As is illustrated, the interrupt request signal 333 is communicated to the instruction address generator 310, and is not independently communicated to every pipeline stage preceding the execute stage 330. In addition, the interrupt request signal 333 is also communicated to logic 390 that includes a counter and flush control logic. In the illustrated embodiment of FIG. 4, the execute unit 330 may also include logic 339 that is configured to detect instructions that impact a pending interrupt. This logic may generate a signal 391 that is communicated to the logic 390. The logic 390 includes multiple outputs 395a–395e that are directed to the individual pipeline stages that precede the execute unit 330. The signals 395a–395e may instruct the individual pipeline stages to perform a flush of that stage using internal flush logic (not specifically illustrated in FIG. 4). In operation, the logic 390 may include a counter that counts clock cycles input on line 397. The interrupt request signal 333 may reset the counter such that the count, at any given time on the counter, will reflect the number of clock cycles that have passed since the assertion of the interrupt request signal 333. Thereafter, if logic 339 detects an instruction that impacts the pending interrupt signal line 391 maybe asserted. Based upon the present count of the counter within logic 390, the logic 390 may generate output signals on signal lines 395a–395e that instruct the appropriate pipeline stages to perform a flush of their contents. Preferably, the logic 390 will have a priori knowledge of the timing and operation of the various pipeline stages. That is, if instructions move from stage to stage at one clock cycle per stage, and the counter has a current count of two, then the logic 390 would know that signal lines 395a and 395b need not be asserted. Instead, only signal lines 395c, 395d, and 395e need to be asserted, thereby performing a flush of the corresponding pipeline stages. In keeping with this concept, if the data or information moves through the pipeline at differing rates or speeds, the same general operation (with respect to the inventive concepts) may be performed by logic 390, so long as logic 390 has sufficient knowledge of the timing of instructions and data through the various pipeline stages.

The embodiments of FIGS. 2, 3, and 4 are provided herein to merely illustrate the inventive concepts of the partial flush operation of the present invention, and should not be deemed as exhaustive illustrations of all possible embodiments. Indeed, a wide variety of other embodiments may be implemented consistent with the scope and spirit of the present invention.

Figure 5:
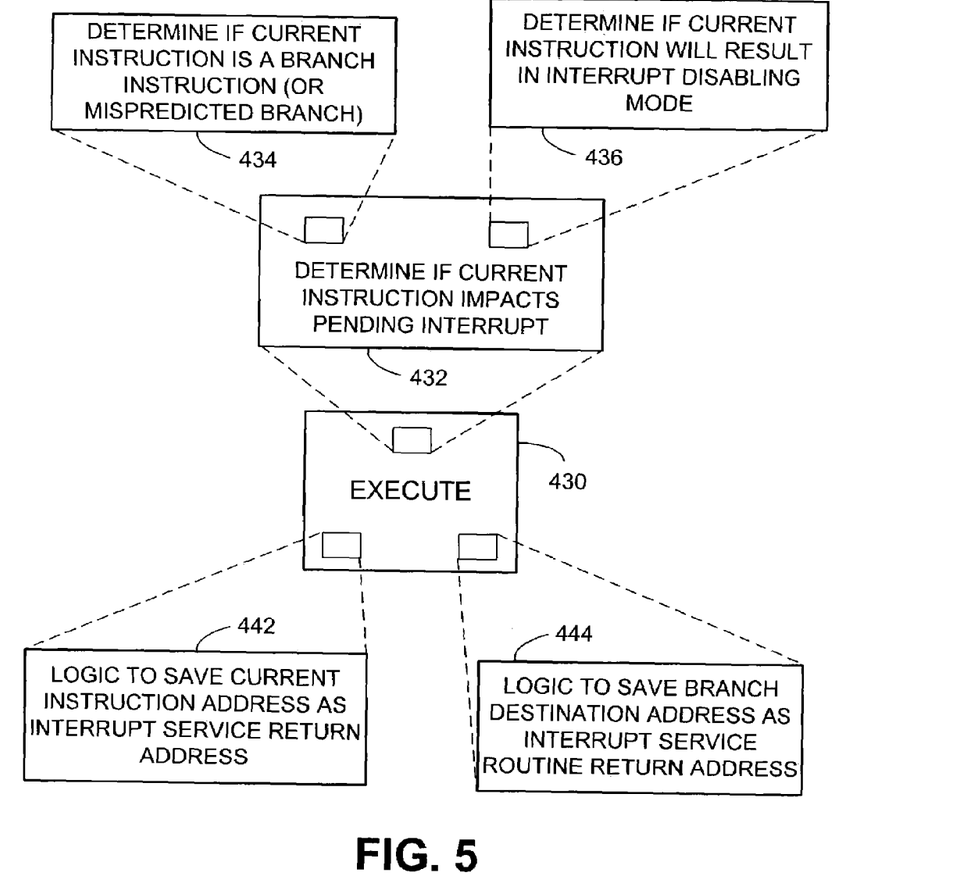
FIG. 5 is a block diagram illustrating certain logic components within an execute stage of a pipelined processor, constructed in accordance with an embodiment of the present invention.

Reference is now made to FIG. 5, which illustrates an execute unit 430 that may be configured or implemented consistent with any of the previously-illustrated embodiments, including execute units 130, 230, and 330. In order to carryout certain features of the various embodiments of the present invention, the execute unit 430 may include logic 432 that is configured to determine if a current instruction impacts a pending interrupt. As previously mentioned, a variety of instructions may impact a pending interrupt, depending upon the particular circuitry and hardware of the processor. Thus, the logic 432 may include logic 434 that is configured to determine if a current instruction is a branch instruction (or a mispredicted branch instruction). As noted above, circuitry or logic (e.g., associated with or in communication with branch prediction logic) may be provided to evaluate whether the branch instruction is mispredicted. In one embodiment of the invention, mispredicted branch instructions (but not correctly predicted branch instuctions) will result in a partial pipeline flush. In other embodiments, all branch instructions may result in a partial pipeline flush (depending, for example, on the desired complexity of the partial flush logic).

Likewise, the logic 432 may include logic 436 to determine if the current instruction will result in an interrupt-disabling mode. Consistent with the concepts and teachings of the invention, logic 432 may include other logic components for detecting other types of instructions that may impact the operation of a pending interrupt.

The execute unit 430 may also include logic for saving (e.g., saving to a stack) the address of the instruction to execute after returning from the interrupt service routine. Such logic may be implemented in a variety of ways. In accordance with one embodiment, such logic may include logic 442 configured to save the current address as the return address, if the current instruction is determined to be an interrupt-disabling instruction. In such a situation, the current address would preferably be saved as the return address as the interrupt-disabling instruction will be flushed and not executed, and therefore will be the first instruction to be executed upon return from the interrupt service routine. The execute unit 430 may also include logic 444 that is configured to save the correct branch destination address as the return address if the current instruction is a branch instruction (or mispredicted branch instruction). That is, the branch instruction itself may be effectively executed by saving as the return address the instruction that is the destination of the branch. Of course, if the branch is a conditional branch, then branch prediction logic may be employed as well.

Figure 6:
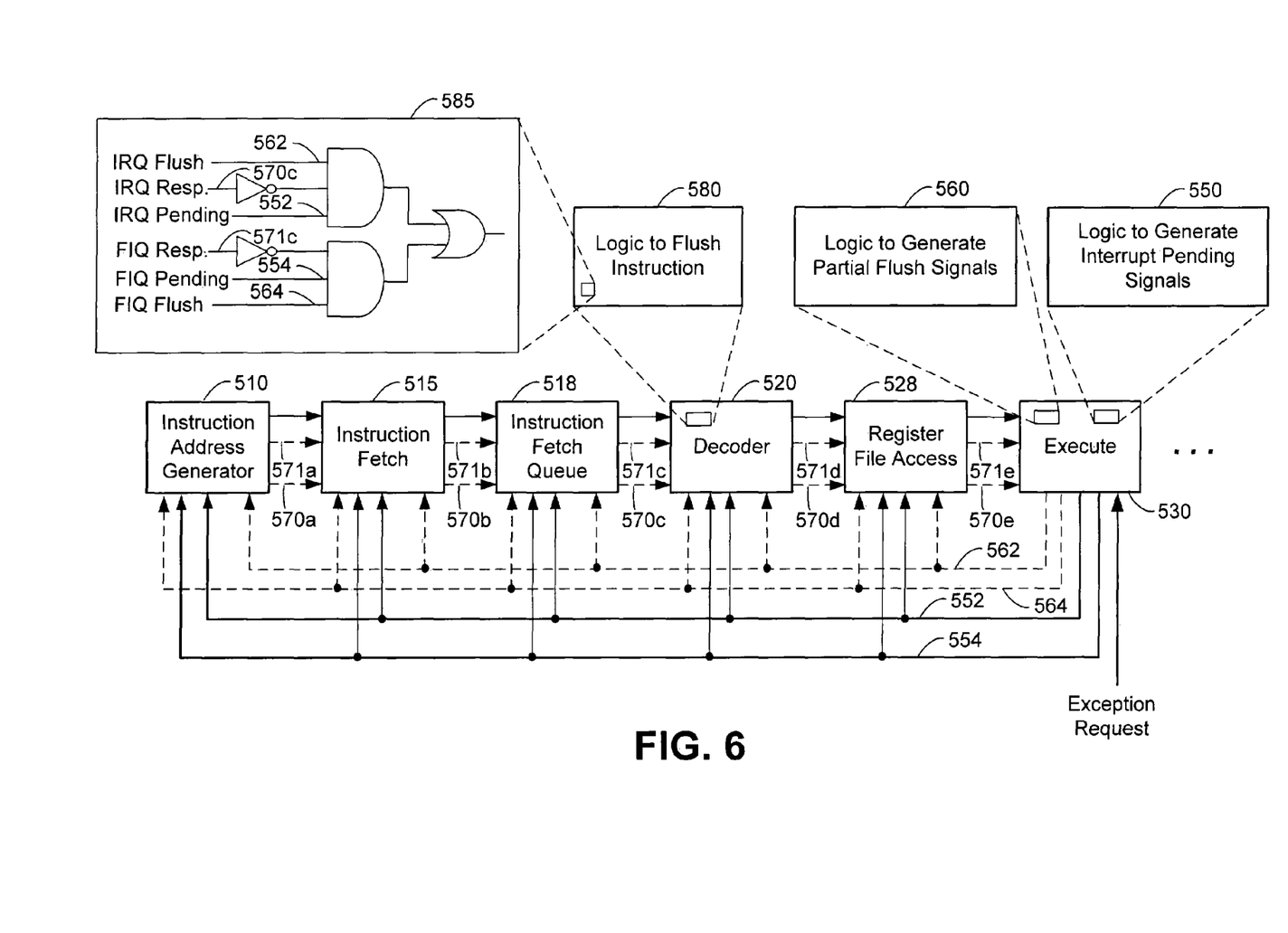
FIG. 6 is a block diagram illustrating certain stages or components of a pipelined processor constructed in accordance with an embodiment of the present invention.

Alternatively, on encountering conditional branch instructions, the execute, unit may save the current address as the return address from the interrupt service routine, in the event that the condition may resolve differently after execution of the interrupt service routine. Again, the foregoing reflect certain implementation details that may vary from embodiment to embodiment, consistent with the scope and spirit of the present invention. Reference is now made to FIG. 6, which is a block diagram similar to FIG. 3, illustrating yet another embodiment of the present invention. The embodiment of FIG. 6 illustrates an expansion of the embodiment of FIG. 3 to handle interrupts of multiple types. In this regard, many processors include a normal interrupt, often labeled as IRQ, as well as a fast interrupt, often labeled as FIQ. The concepts of the present invention are equally applicable to a pipelined processor having the ability to support multiple types of interrupts. Therefore, the logic 550 configured to generate interrupt pending signals may generate an IRQ pending signal 552 as well as an FIQ pending signal 554. Likewise, the logic 560 that is configured to generate partial flush signals may be configured to generate a separate flush signal for each interrupt type, such as a flush signal 562 for the IRQ interrupt and a flush signal 564 for the FIQ interrupt. In other embodiments, a single flush signal may be sufficient for both types of interrupts.

As described in connection with FIG. 3, each processor stage includes logic 580 for carrying out a flush of that pipeline stage. The flush logic 580 may include comparison logic 585 that differs slightly from the comparison logic 285 of FIG. 3, and that the comparison logic may take into account all relevant signals. One logical implementation for such comparison logic has been illustrated in FIG. 6, but need not be specifically described as its operation will be apparent to those skilled in the art from the diagram provided. Further, interrupt response signals 570a–570e may be provided to indicate the progression of an IRQ interrupt passing through the pipeline stages, just as interrupt response signals 270a–270e were described to operate in connection with FIG. 3. In addition, the pipeline stages may also include a second interrupt response signals 571a–571e, which may be used to signal the progression of the FIQ interrupt through the pipeline stages. Again, depending upon the specific structure and implementation of the pipeline, the structure and implementation of the interrupts (e.g., whether the interrupts are maskable or non-maskable, as well as the priority of the interrupts, and a variety of other factors), a variety of differing circuitry and logic components may be provided in connection with FIG. 6 for purposes of carrying out specific features of the illustrated embodiment. However, such implementation details need not be described herein in order to understand the expansion of the present invention to encompass processors capable of supporting multiple interrupts.

Figure 7:
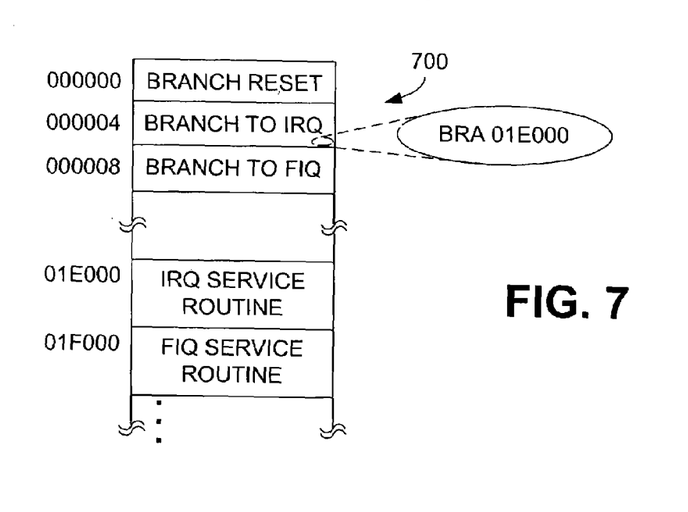
FIG. 7 is a diagram illustrating a segment of memory having interrupt vectors and interrupt service routines for IRQ and FIQ interrupts.

Reference is now made briefly to FIG. 7, which illustrates portions of memory 700 that are utilized for implementing interrupts. As is known, the memory space of many processor systems has certain restricted areas for carrying out very specific features and operations. One such operation is the handling of interrupts. When an interrupt, such an IRQ, is requested, the processor is often said to "vector" to that interrupt. In this regard, a unique address (or address range) is assigned to that interrupt. Often, the address range is just enough to support a branch instruction to the interrupt service routine for handling the IRQ interrupt. In the illustration of FIG. 7, memory space at address 000000-000003 is dedicated to a reset vector. Typically, when the power is applied or a reset signal is asserted to the processor, then the processor vectors to this address to handle or branch to its reset routine. Address space 000004-000007 is dedicated to the IRQ (e.g., the IRQ vector), and address space 000008-00000B is dedicated to the FIQ vector. If the user-defined interrupt service routine for the IRQ interrupt is stored beginning at address 01E000, then the IRQ vector may contain an unconditional branch instruction to branch to address 01E000 as described previously. A return address for that interrupt service routine will be stored in a processor register, so that when the return instruction within the IRQ service routine itself is encountered, the return address will be loaded into the program counter and the instruction at that address will then be fetched for continued operation of the processor.

Figure 8:
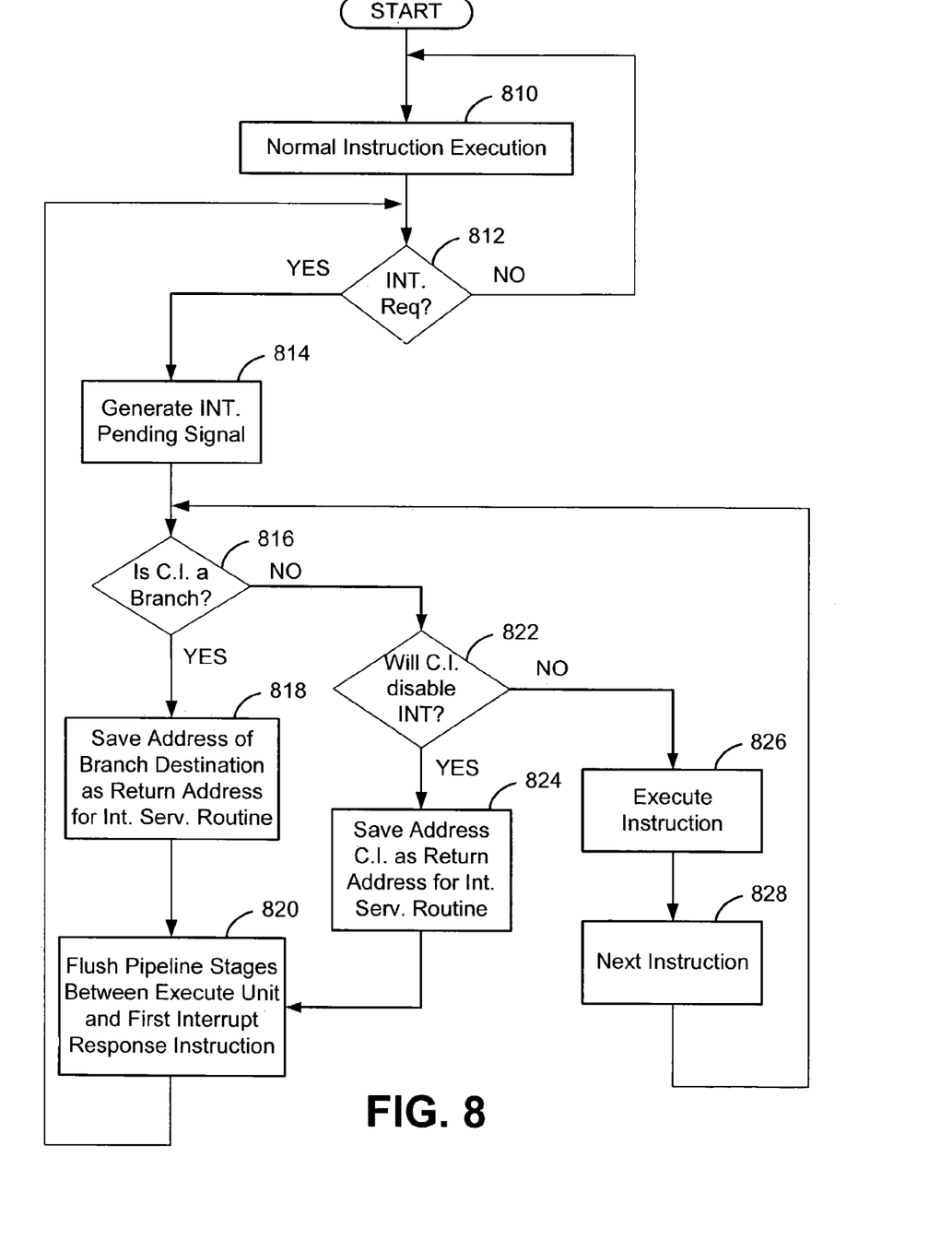
FIG. 8 is a flowchart illustrating the top-level functional operation of an embodiment of the present invention.

Reference is now made to FIG. 8, which is a flowchart illustrating the top-level functional operation of one embodiment of the present invention. In this regard, the processor may carry out normal instruction execution (step 810) until an exception request is received by the processor (step 812). When this occurs, the processor may assert an interrupt pending signal (step 814). In accordance with one embodiment, a check may then be made to determine if the current instruction (in the execute unit of the pipeline) is a branch instruction (or mispredicted branch instruction) (step 816). If so, then the method may save the address of the correct branch destination instruction as the return address for the interrupt service routine (step 818). Thereafter, the method may flush the stages of the pipeline between the current instruction and the pipeline stage having the first instruction associated with the interrupt service routine (step 820).

If the check of step 816 resolves to no (i.e., the current instruction is not a branch instruction), then the method may determine whether the current instruction is an instruction that will disable the pending interrupt (step 822). If so, then the method may save the address of the current instruction as the return address for the interrupt service routine (step 824), and proceed to step 820. If the current instruction is neither a branch nor an instruction that will disable the pending interrupt, then the method may continue by executing the current instruction (step 826) and then proceed to pass the next instruction to the execute stage of the pipeline (step 828). Thereafter, the method may return and repeat the previously-described steps, beginning with step 816.

Figure 9:
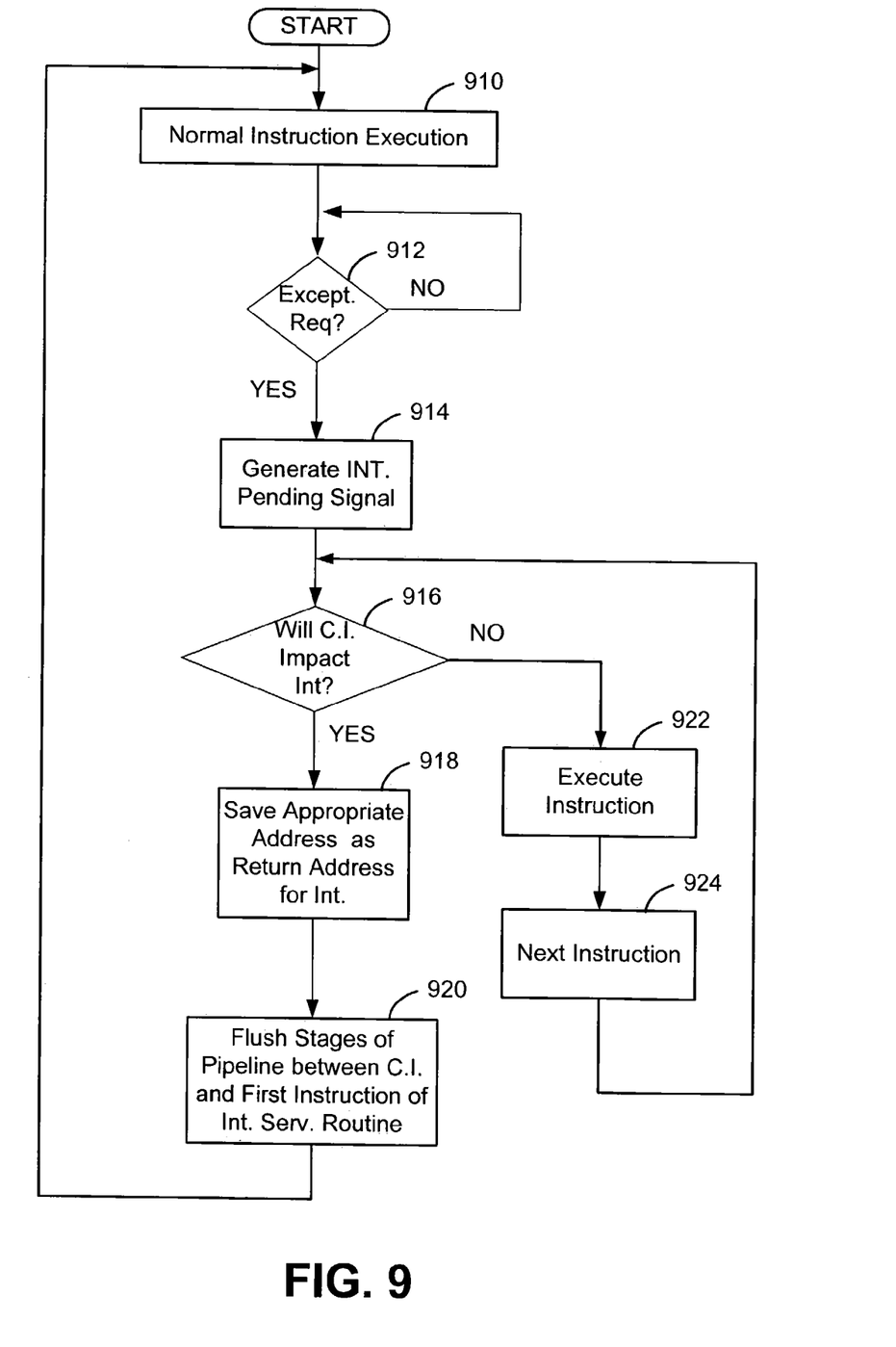
FIG. 9 is a flowchart illustrating the top-level functional operation of another embodiment of the present invention.

Reference is now made to FIG. 9, which is a flowchart illustrating the top-level operation of an alternative embodiment of the present invention. Like FIG. 8, the embodiment of FIG. 9 performs normal instruction execution (step 910) until an exception request is received (step 912). Upon receipt of the exception request, the method generates an interrupt pending signal (step 914). Thereafter, the method of FIG. 9 determines whether the current instruction will impact the pending interrupt (step 916). If so, the method saves an appropriate address as the return address for the interrupt service routine (step 918). In this regard, an "appropriate" return address may depend upon the particular architecture of the processor, as well as the instruction that is determined in step 916 to have an impact on the pending interrupt. For example, the return address may be the address of the current instruction, it may be the address of the instruction following the current instruction, it may be an address generated by branch prediction logic (if the current instruction is a branch instruction), etc.

Thereafter, the method flushes the intervening stages of the pipeline between the current instruction and the first instruction associated with the pending interrupt (step 920).

If the determination of step 916 determines that the current instruction will not impact the pending interrupt, then the method executes the current instruction (step 922) and then proceeds to pass the following instruction to the execute stage of the pipeline (step 924). Thereafter, the method returns to step 916 and performs the above-described determination.

For simplicity, all implementation features have not been illustrated in the flowcharts of FIGS. 8 and 9. What should be appreciated from the illustration and the foregoing discussion is that if none of the instructions within the stages of the pipeline preceding the first instruction associated with the interrupt will have an adverse impact on the interrupt, then all of those instructions may proceed through execution thereby enhancing the efficiency of the processor operation. The flowcharts of FIGS. 8 and 9 do not specifically illustrate the determination that the current instruction might be the last instruction preceding the interrupt (i.e., that all instructions have executed prior to the first instruction of the interrupt). In such a situation, the methods illustrated in the flowcharts in FIGS. 8 and 9 may return to the first step noted as "normal instruction execution."

The foregoing description is not intended to be exhaustive or to limit the invention to the precise forms disclosed. Obvious modifications or variations are possible in light of the above teachings. For example, the embodiments described herein relate to interrupt handling. However, the partial flush concepts of the present invention may also be applicable to exception handling. In this regard, exception handling in most processors is handled similar to the interrupt handling described herein. Certain exceptions may be required to be processed immediately, resulting in a full and immediate flush of the pipeline, as is known in the prior art. However, depending on the exception and the processor, certain exceptions may be handled in the same manner (i.e., only conditional and/or partial pipeline flush) as the interrupt exceptions described herein.

Further, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A processor comprising:
   a plurality of logic components organized in a pipeline, wherein one of the logic components is an execute component;
   a mechanism for indicating that an interrupt is pending;
   logic capable of determining whether execution of a current instruction within the execute component will impact the execution of the pending interrupt; and
   logic capable of performing a partial flush of the pipeline, wherein only instructions between the current instruction and a first instruction associated with the pending interrupt are flushed.

2. The processor of claim 1, wherein the plurality of logic components comprises a fetch component and a decode component, in addition to the execute component.

3. The processor of claim 1, wherein the plurality of logic components comprises an address generation component, a fetch component, an instruction queue, a decode component, a register file access component, a data access component, and a retirement component, in addition to the execute component.

4. The processor of claim 1, wherein the mechanism for indicating that the interrupt is pending comprises an electrical signal that is input to pipeline components that precede the execute component in the pipeline.

5. The processor of claim 1, wherein the execute component comprises logic for generating the electrical signal in response to an exception request.

6. The processor of claim 1, further comprising
   a mechanism for indicating that a second interrupt is pending;
   logic capable of determining whether execution of the current instruction within the execute component will impact the execution of the pending second interrupt; and
   logic capable of performing a partial flush of the pipeline, wherein only instructions between the current instruction and a first instruction associated with the pending second interrupt are flushed.

7. The processor of claim 6, wherein the interrupt is a normal interrupt and the second interrupt is an fast interrupt.

8. The processor of claim 1, wherein the logic capable of determining whether execution of current instruction within the execute component will impact the execution of the pending interrupt is configured to determine whether the current instruction is one that will disable the pending interrupt.

9. The processor of claim 1, wherein the logic capable of determining whether execution of current instruction within the execute component will impact the execution of the pending interrupt is configured to determine whether the current instruction is a branch instruction.

10. The processor of claim 1, further including return instruction logic capable of setting a return address for instruction execution upon return from an interrupt service routine of the pending interrupt, the return instruction logic being operative in association with the logic capable of performing a partial flush.

11. The processor of claim 10, wherein the return instruction logic is configured to save, as a return address from the interrupt service routine, an address of the current instruction, if execution of the current instruction would result in a disabling of the pending interrupt.

12. The processor of claim 10, wherein the return instruction logic is configured to save, as a return address from the interrupt service routine, the correct destination address, if the current instruction is a mispredicted branch instruction.

13. A pipelined processor comprising:
interrupt logic configured to indicate that an interrupt is pending;
determining logic configured to determine whether execution of a current instruction within an execute stage of the pipelined processor will impact the execution of the pending interrupt; and
flush logic configured to flush only instructions between the current instruction and a first instruction associated with the pending interrupt.

14. The pipelined processor of claim 13, further comprising a mechanism for indicating that an interrupt is pending.

15. The pipelined processor of claim 14, wherein the mechanism is configured to generate an electrical signal in response to an exception request.

16. A portable electronic device containing the pipelined processor of claim 13.

17. A method executed by a processor while an interrupt is pending and before an interrupt service routine has begun execution, the method comprising:
determining whether execution of a current instruction will impact the execution of the pending interrupt; and
performing a partial flush of pipeline stages, wherein only instructions between the current instruction and a first instruction associated with the pending interrupt are flushed.

18. The method of claim 17, further comprising generating a signal indicating that an interrupt is pending.

19. The method of claim 18, wherein the generating a signal generates the signal in response to an exception request.

20. The method of claim 18, further comprising communicating the signal to all pipeline stages preceding an execute stage.

21. The method of claim 18, further comprising setting a counter, used to count pipeline stages, in association with the signal.

22. The method of claim 17, wherein the performing a partial flush of pipeline stages includes saving, as a return address from the interrupt service routine, an address of the current instruction, if execution of the current instruction would result in a disabling of the pending interrupt.

23. The method of claim 17, wherein the performing a partial flush of pipeline stages includes saving, as a return address from the interrupt service routine, a correct destination instruction address, if the current instruction is a mispredicted branch instruction.

24. A processor comprising:
a plurality of logic components organized in a pipeline, wherein one of the logic components is an execute component;
a mechanism for indicating that an exception is pending;
logic capable of determining whether execution of a current instruction within the execute component will impact the execution of the pending exception; and
logic capable of performing a partial flush of the pipeline, wherein only instructions between the current instruction and a first instruction associated with the pending exception are flushed.

25. The method of claim 24, wherein the exception is an interrupt.

26. A method executed by a processor while an exception is pending and before an exception service routine has begun execution, the method comprising:
determining whether execution of a current instruction will impact the execution of the pending exception; and
performing a partial flush of pipeline stages, wherein only instructions between the current instruction and a first instruction associated with the pending exception are flushed.

* * * * *